(12) United States Patent
Kajaria et al.

(10) Patent No.: US 9,127,545 B2
(45) Date of Patent: Sep. 8, 2015

(54) DELIVERY SYSTEM FOR FRACTURE APPLICATIONS

(71) Applicant: GE Oil & Gas Pressure Control LP, Houston, TX (US)

(72) Inventors: Saurabh Kajaria, Houston, TX (US); Khang Nguyen, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 215 days.

(21) Appl. No.: 13/870,622

(22) Filed: Apr. 25, 2013

(65) Prior Publication Data

US 2013/0284455 A1    Oct. 31, 2013

Related U.S. Application Data

(60) Provisional application No. 61/638,818, filed on Apr. 26, 2012.

(51) Int. Cl.
  *E21B 43/26*  (2006.01)
  *E21B 33/03*  (2006.01)
  *F16L 23/08*  (2006.01)

(52) U.S. Cl.
  CPC .............. *E21B 43/26* (2013.01); *E21B 33/03* (2013.01); *F16L 23/08* (2013.01)

(58) Field of Classification Search
  CPC ................................ E21B 43/12; E21B 43/26
  See application file for complete search history.

(56) References Cited

U.S. PATENT DOCUMENTS

| | | |
|---|---|---|
| 4,218,080 A | 8/1980 | Kendrick |
| 4,448,535 A | 5/1984 | West |
| 5,799,734 A | 9/1998 | Norman et al. |
| 6,306,800 B1 | 10/2001 | Samuel et al. |
| 6,435,277 B1 | 8/2002 | Qu et al. |
| 6,698,915 B2 | 3/2004 | Dearing et al. |
| 7,073,592 B2 | 7/2006 | Polsky et al. |
| 7,478,673 B2 | 1/2009 | Boyd |
| 7,841,394 B2 | 11/2010 | McNeel et al. |
| 7,921,914 B2 | 4/2011 | Bruins et al. |
| 8,146,665 B2 | 4/2012 | Neal |
| 8,261,841 B2 | 9/2012 | Bailey et al. |
| 2008/0029267 A1 | 2/2008 | Shampine et al. |
| 2010/0032031 A1 | 2/2010 | Neal |
| 2010/0326663 A1 | 12/2010 | Bobier et al. |
| 2011/0048695 A1 | 3/2011 | Cherewyk et al. |
| 2011/0259584 A1 | 10/2011 | Broussard, Ii |
| 2011/0272158 A1 | 11/2011 | Neal |
| 2012/0085541 A1 | 4/2012 | Love et al. |

(Continued)

OTHER PUBLICATIONS

International Search Report and Written Opinion issued in connection with corresponding PCT Application No. PCT/US2013/038178 dated Sep. 29, 2014.

(Continued)

*Primary Examiner* — William P Neuder (74) *Attorney, Agent, or Firm* — Bracewell & Giuliani LLP (57) ABSTRACT

Described herein is a modular, adjustable system for distributing fluids to one or more wellbores. The system is readily configured and assembled at a well site, and allows for one portion of the system to be isolated for service or repair while the remainder of the system continues to operate. The system includes a plurality of pump skids having both a distribution junction in fluid communication with inlets to of plurality of pump trucks and an exit junction in fluid communication with outlets of the plurality of pump trucks.

18 Claims, 8 Drawing Sheets

(56) References Cited

U.S. PATENT DOCUMENTS

| | | | |
|---|---|---|---|
| 2012/0181013 A1* | 7/2012 | Kajaria et al. | 166/79.1 |
| 2012/0181015 A1 | 7/2012 | Kajaria et al. | |
| 2012/0181016 A1 | 7/2012 | Kajaria et al. | |
| 2012/0181030 A1 | 7/2012 | Kajaria et al. | |
| 2012/0181046 A1* | 7/2012 | Kajaria et al. | 166/380 |
| 2012/0255734 A1* | 10/2012 | Coli et al. | 166/305.1 |

OTHER PUBLICATIONS

API 6A Mud Valves (Complete Solutions for Industrial Valves)—Neway Valve, Cat. No. E-MV-2004, pp. 1-4.

\* cited by examiner

DELIVERY SYSTEM FOR FRACTURE APPLICATIONS

CROSS-REFERENCE TO RELATED APPLICATIONS

This application claims priority to and the benefit of co-pending U.S. Provisional Application 61/638,818, filed Apr. 26, 2012, the full disclosure of which is hereby incorporated by reference herein for all purposes.

BACKGROUND OF THE INVENTION

1. Field of the Invention

Embodiments of the present invention relate in general to fluid delivery systems and in particular to manifolds for delivering fluids under pressure.

2. Description of the Related Art

Often in oilfield operations, fluids are pumped into a wellbore extending through a geologic formation. Hydraulic fracturing is an example of an oilfield operation in which fluids are pumped into a wellbore at a sufficient pressure to fracture the geologic formation. Fracturing the geologic formation provides a conductive path for hydrocarbons captured in the geologic formation to reach the wellbore, and thereby facilitates recovery of the hydrocarbons through the wellbore.

In general, the equipment used in hydraulic fracturing includes a tank or other source of low-pressure fracturing fluid, a slurry blender, a plurality of high-pressure, high volume fracturing pumps, and various hoses and pipelines to direct the flow of the fracturing fluid to the wellbore. The management of the number of trucks, pumps, containers, pipelines, and other equipment for a fracturing system presents significant challenges to an operator. For example, it is often necessary to interrupt operations to investigate a malfunction or to repair the equipment. Additionally, to be cost effective, once fracturing operations are complete at a first well site, the complex system of equipment must often be disassembled, relocated, and reassembled at another well site for reuse. These connections and disconnections consume a considerable amount of time and manpower.

SUMMARY OF THE INVENTION

Described herein is a modular, adjustable system for distributing fluids to one or more wellbores. The system allows for one portion of the system to be isolated for service or repair while the remainder of the system continues to operate. The system is also readily configured and assembled at a well site.

According to one aspect of the disclosure, a delivery system for delivering fluid to a wellhead includes a water pipeline having an end in fluid communication with a water supply, and a water supply branch that is in fluid communication with the water pipeline and that connects to an inlet of a water pump. A slurry pipeline has an end in fluid communication with a supply of slurry, and a slurry supply branch is in fluid communication with the slurry pipeline and connects to an inlet of a slurry pump. A high-pressure pipeline has an end in fluid communication with the wellhead. A water exit branch is in fluid communication with the high pressure pipeline and connects to an outlet of the water pump, and a slurry exit branch is in fluid communication with the high pressure pipeline and connects to an outlet of the slurry pump.

In some embodiments, the delivery system further includes a first pump skid supporting a first distribution junction and a first exit junction thereon, and the slurry supply branch connects to the inlet of the slurry pump through the first distribution junction and the slurry exit branch connects to the outlet of the slurry pump through the first exit junction. In some embodiments, the delivery system further includes a second pump skid supporting a second distribution junction and a second exit junction thereon, and the water supply branch connects to the inlet of the water pump through the second distribution junction and the water exit branch connects to the outlet of the water pump through the second exit junction. In some embodiments, the slurry supply branch connects to a plurality of slurry pumps through the first distribution junction and the slurry exit branch connects to the plurality of slurry pumps through the first exit junction.

In some embodiments, the delivery system further includes a valve fluidly coupled between the outlet of the slurry supply branch and the exit junction such that the slurry pump is selectively isolatable from the high pressure pipeline. In some embodiments, the delivery system further includes a valve unit fluidly coupled between the first exit junction and the slurry exit branch such that the plurality of slurry pumps are selectively isolatable from the high pressure pipeline.

In some embodiments, the supply of slurry is in fluid communication with the water supply. In some embodiments, the water pipeline and the slurry pipeline are in parallel with the high-pressure pipeline. In some embodiments, the delivery system further includes a frac skid adjacent the wellhead, and the frac skid includes at least one frac manifold in fluid communication with the high-pressure pipeline. In some embodiments, the first and second pump skids each include a jack operable to adjust an elevation of the respective pump skid, and in some embodiments, the delivery system further includes an elevation measurement device, and the first and second pump skids each include a leveling target thereon providing a reference for the elevation measurement device.

According to another aspect of the disclosure, a collection manifold for delivering fluid to a wellhead includes a first low-pressure pipeline comprising an end in fluid communication with a source of fluid and a high-pressure pipeline having an end in fluid communication with the wellhead. A first pump skid supports a first distribution junction and a first exit junction thereon. The first low-pressure pipeline connects to an inlet of a first pump through the first distribution junction and the high-pressure pipeline connects to an outlet of the first pump through the first exit junction. A second pump skid is disposed remotely from the first pump skid. The second pump skid supports a second distribution junction and a second exit junction thereon, and the first low-pressure pipeline connects to an inlet of a second pump through the second distribution junction and the high-pressure pipeline connects to an outlet of the second pump through the second exit junction.

In some embodiments, the high-pressure pipeline connects to a plurality of pumps through a plurality of inlets defined in the first exit junction, and the plurality of inlets are arranged on two opposing sides of the first pump skid. In some embodiments, the first and second exit junctions are fluidly coupled in series to one another. In some embodiments, the delivery system further includes a bypass high-pressure pipeline in fluid communication with the first and second exit junctions.

In some embodiments, the first low-pressure pipeline is a slurry pipeline in fluid communication with a source of slurry. In some embodiments, the collection manifold further includes a second low pressure pipeline, and the second low-pressure pipeline is a water pipeline in fluid communication with a water source and in fluid communication with the high-pressure pipeline through a third pump.

In some embodiments, the collection manifold further includes a safety blanket positioned between the first and second pump skids. In some embodiments, the high-pressure pipeline includes first and second high-pressure pipe segments coupled to one another by a hub connector having a seal ring disposed longitudinally between the first and second pipe segments and a clamping ring with two opposing members operable to urge the first and second pipe segments longitudinally toward one another in response to movement of the two opposing members toward one another in a lateral direction.

According to another aspect of the disclosure, a method of assembling a manifold for delivering fluid to a wellhead includes (i) assembling a distribution junction and an exit junction to each of a plurality of bases to form a plurality of pump skids, (ii) arranging the plurality of pump skids at a well site, (iii) fluidly coupling a first low-pressure pipeline to at least one the distribution junctions disposed on the plurality of pump skids, wherein the first low pressure pipeline extends to a fluid source, and (iv) fluidly coupling a high-pressure pipeline to each of the exit junctions disposed on the plurality of pump skids, wherein the high-pressure pipeline extends to the wellhead.

BRIEF DESCRIPTION OF THE DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

DETAILED DESCRIPTION OF THE EXEMPLARY EMBODIMENTS

The present invention will now be described more fully hereinafter with reference to the accompanying drawings, which illustrate various embodiments of the invention. This invention, however, may be embodied in many different forms and should not be construed as limited to the illustrated embodiments set forth herein; rather, these embodiments are provided so that this disclosure will be thorough and complete, and will fully convey the scope of the invention to those skilled in the art.

1. Modularity and Isolation

Figure 1:
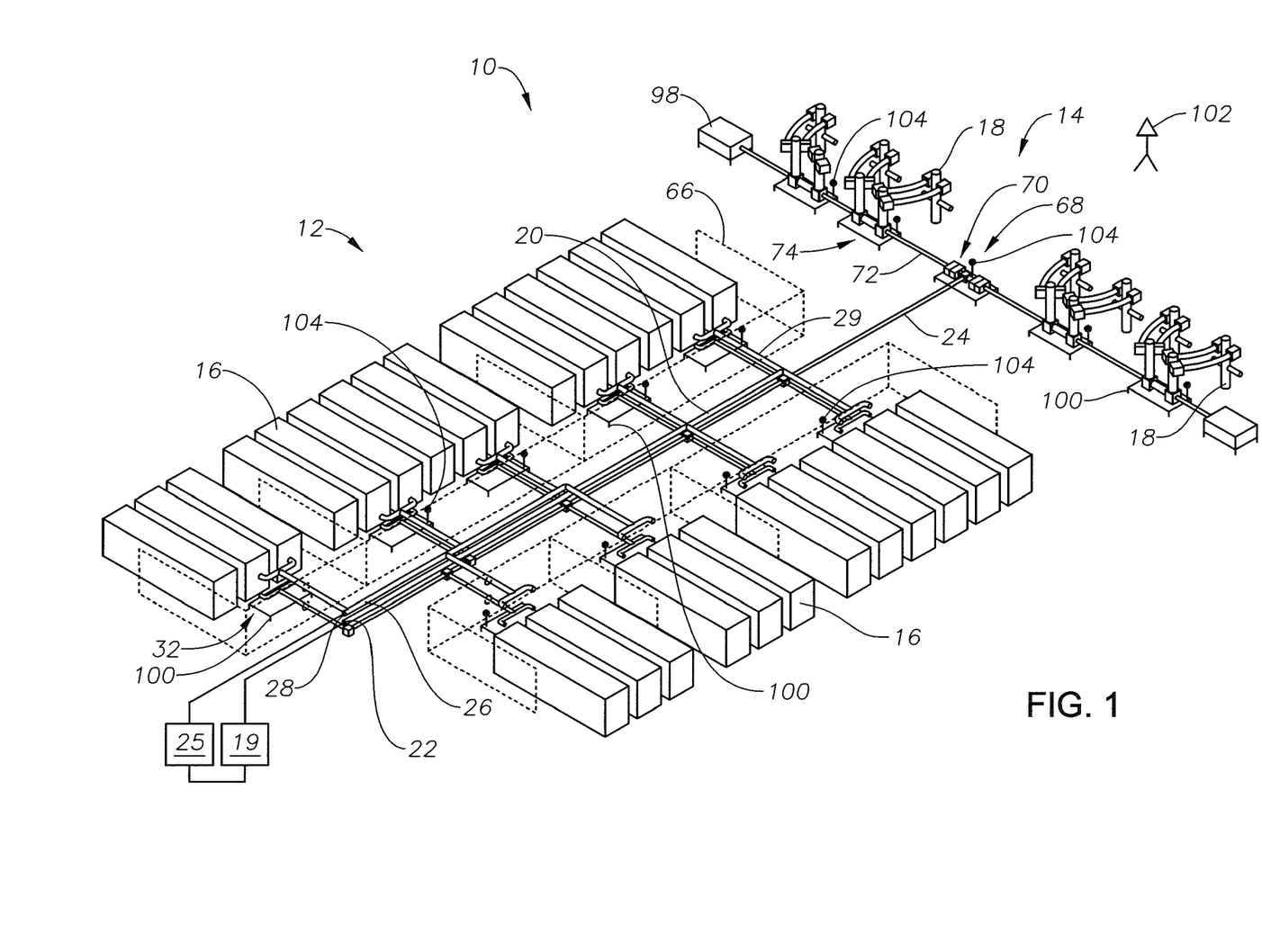
FIG. 1 is a perspective view of a delivery system according to an embodiment of the present invention.

Referring to FIG. 1, shown in an overhead perspective view is an example of a delivery system 10 for use in delivering fluids under pressure includes a collection manifold 12 and a delivery section 14. This delivery system 10 may be used, for example, for delivering fracturing fluids through pump trucks 16 to wellheads 18. The fracturing fluids may be made up of sand, water and other additives, which is mixed in blenders 19 to create a low-pressure slurry. This slurry is conveyed to the pump trucks 16 by way of a slurry pipeline or first low-pressure pipeline 20. The blenders 19 connect to first low-pressure pipeline 20 at slurry input end 22. The pump trucks 16 pressurize the slurry and transfer it to high-pressure pipeline 24. Instead of receiving slurry, some pump trucks 16 may instead pressurize water only. Water is provided from water source 25. Water enters a water pipeline or second low-pressure pipeline 26 at water source end 28 and is conveyed through second low-pressure pipeline 26 to one or more of the pump trucks 16. Water source 25 is also in fluid communication with the blenders 19 such that water from the water source 25 is supplied to the blenders 19 to create the low pressure slurry in some embodiments.

Figure 2:
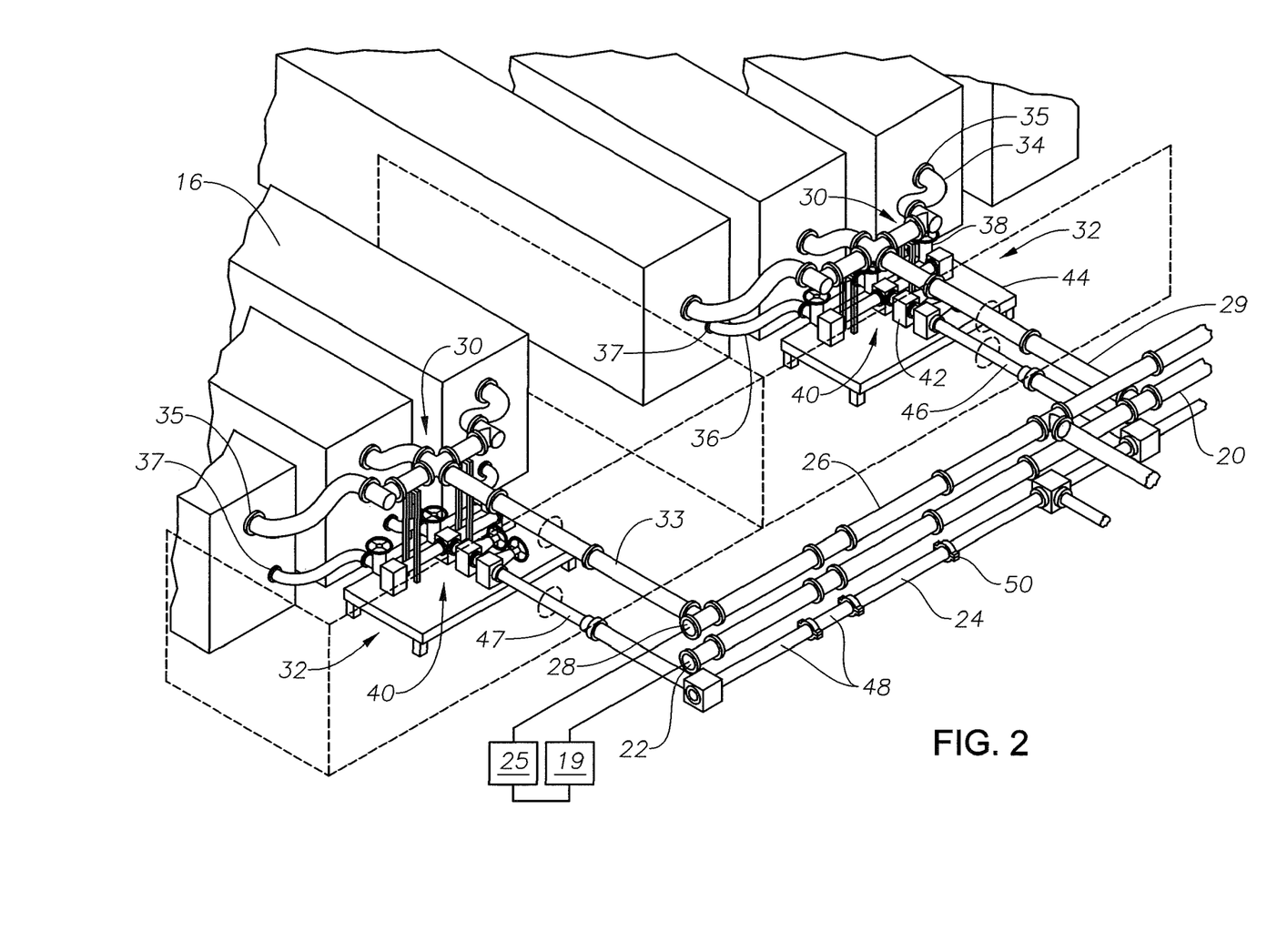
FIG. 2 is a perspective view of a portion of a collection manifold of the system of FIG. 1 according to an embodiment of the present invention.

As is best seen in FIG. 2, after entering slurry input end 22, the slurry travels from first low-pressure pipeline 20 to truck slurry supply branch 29. Truck slurry supply branch 29 is in fluid communication with a distribution junction 30 located on a pump skid 32. A water supply branch 33 extending from the second low-pressure pipeline 26 is similarly in fluid communication with a distribution junction 30 located on another pump skid 32. The distribution junction 30 directs the low-pressure slurry from the truck slurry supply branch 29 to a truck connection line 34 which provides the slurry to an inlet 35 one of the pump trucks 16. The distribution junction 30 is in fluid communication with multiple truck connection lines 34 and divides the slurry flowing in truck slurry supply branch 29 between the truck connection lines 34. Truck connection line 34 may be, for example, either a flexible flow line or a rigid pipeline. In some embodiments, a valve (not shown) may be situated between the truck slurry supply branch 29 and the truck connection lines 34 to selectively block or allow fluid communication between the truck slurry supply branch 29 and the truck connection line 34.

After the slurry is pressurized within pump truck 16, the pressurized slurry exits the pump truck 16 into truck exit line 36 through outlet 37. Truck exit line 36 may be, for example, either a flexible flow line or a rigid pipeline. One end of truck exit line 36 is in fluid communication with one of the pump trucks 16 and the other end of truck exit line 36 is in fluid communication with a truck exit valve 38 situated on a pump skid 32. Truck exit valve 38 may be any suitable valve capable of operating at the design criteria, including pressure, of the pressurized slurry.

From the truck exit valve 38 the pressurized slurry passes into an exit junction 40 shown located on pump skid 32. Exit junction 40 includes a line in communication with multiple exit valves 38 and combines the pressurized slurry from one or more pump trucks 16. Exit junction 40 directs the slurry to truck exit valve unit 42. Truck exit valve unit 42 is in fluid communication with exit junction 40; which may include an isolation valve, and may be a single valve or two valves in series. Truck exit valve unit 42 is also located on pump skid 32. The equipment included in pump skid 32 is supported by a pump skid base 44.

Still referring to FIG. 2, after passing through the truck exit valve unit 42, slurry enters the slurry exit branch 46. One end of slurry exit branch 46 is in fluid communication with truck exit valve unit 42 and the other end of slurry exit branch 46 is in fluid communication with high-pressure pipeline 24. Slurry exit branch 46 may have a single diameter flow line, or may include segments of flow lines with varying diameters. In one embodiment, the diameter of slurry exit branch 46 is larger proximal to high-pressure pipeline 24 and is smaller distal from high-pressure pipeline 24.

Water is similarly conveyed from pump trucks 16 to high pressure pipeline 24 through a water exit branch 47. In some embodiments of use, both water and slurry are introduced to high pressure pipeline 24 simultaneously from slurry exit branch 46 and water exit branch 47. In other embodiments of use, truck exit valves 38 and/or valve units 42 are appropriately actuated such that water or slurry is individually introduced into high-pressure pipeline 24.

Figure 3A:
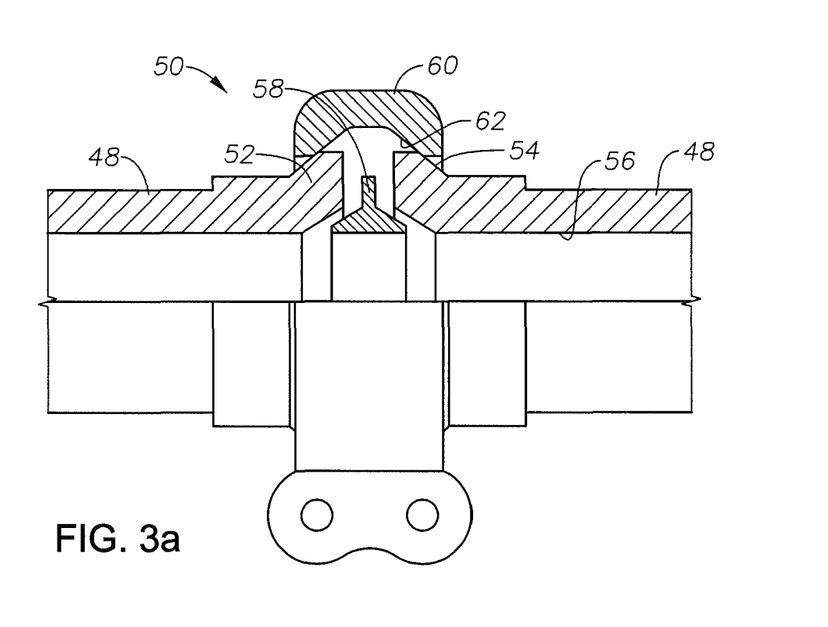
FIG. 3a is a partial sectional view of a hub connector in the open position according to an embodiment of the present invention.
Figure 3B:
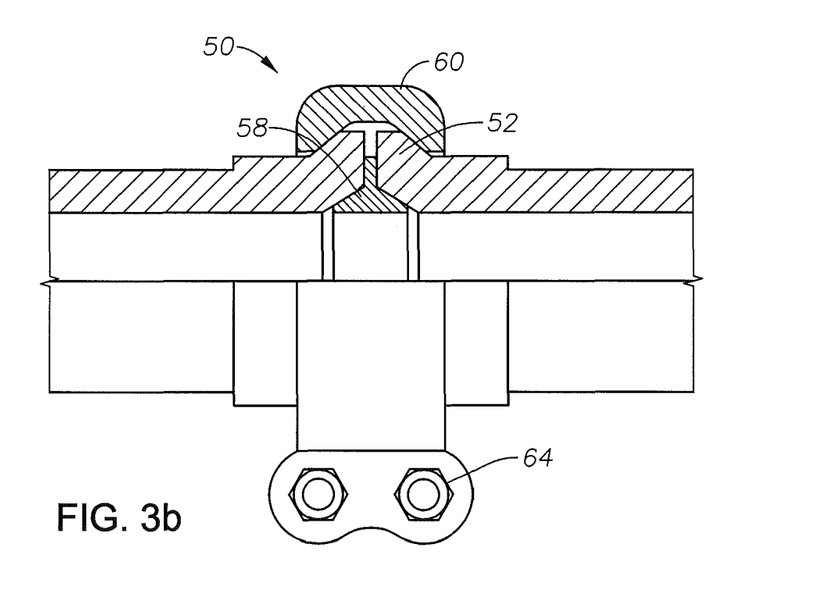
FIG. 3b is a sectional view of a hub connector in a closed position according to an embodiment of the present invention.

High-pressure pipeline 24 includes a number of pipe segments 48. High-pressure pipe segments 48 may be connected to each other using a hub connector 50. Turning to FIGS. 3a-3b, each end of high-pressure pipe segments 48 have a radially outward protruding hub portion 52 with a hub outer surface 54 which is disposed at an oblique to the central bore 56 of the pipe segment 48. An annular seal ring 58 inserts between the end surfaces of consecutive pipe segments 48. A clamping ring 60 includes two semi-circular members that each have an inner cam surface 62 that engages outer surface 54 of the hub portions 52 when the semicircular members of clamping ring 60 are moved toward one another in a lateral direction, causing the ends of the pipe segments 48 to move longitudinally towards each other and come into sealing engagement with opposite sides of seal ring 58, as shown in FIG. 3b. Bolts 64 secure both of the semi-circular members of the clamping ring 60 together at each side. Bolts 64 are perpendicular to the central bore 56 of the pipe segment 48.

Although other connection means, such as bolted flanges or hammer unions may be used, applicants have recognized a need to employ an alternative connection means that is less time consuming and has a low risk of causing injury to personnel during installation. In addition, there may be a significant amount of bending moments as well as other stresses, strains, and resulting vibrations acting on the high-pressure pipeline 24. Such forces lead to wear and tear on the connection means, often causing failure of the connection means. For example, when a connection means with bolts that are parallel to the central bore 56 of the pipe segment 48 is used, the bolts may stretch under the applied bending moments and vibrational forces. Such stretching may result in leakage at the connection means and require the repair or replacement of the connection means. Not only is this costly and time consuming, but it could create a hazardous situation.

In addition, connection means such as bolted flanges or hammer unions do not generally accommodate the same degree of misalignment of the pipe ends as the hub connectors 50. Thus, connection means such as bolted flanges or hammer unions make it time consuming to make up each of the connections between pipe segments 48 as there would be no margin of error allowable when mating the pipe segments 48. Also, applicants have recognized that it would be desirable to use a connection means that could handle misalignment if high-pressure pipeline 24 was to become out of alignment during operations. The hub connector 50 can manage misalignment and would therefore decrease the time required to connect pipe segments 48 and can handle some degree of misalignment of high-pressure pipeline 24 during operations. Not only can hub connector 50 manage misalignment, it also has a better bending capability than traditional flanged connections, reducing the risk of failure from applied loads.

Returning to FIG. 1, the delivery system 10 includes a plurality of pump skids 32, each with one or more pump trucks 16 connected thereto. The number and layout of the pump trucks 16 and pump skids 32 can vary depending on the needs of a particular operation. Pump skids 32 may be standardized and pre-fabricated before delivery to the installation site. This will improve the efficiency, cost and time of installation as well as reduce manufacturing expenses. Standardization of the pump skids 32 will also allow for the pump skids 32 to be more easily utilized at a subsequent site.

Pump trucks 16 in the embodiment of FIG. 1 are connected in parallel, allowing for one pump truck 16 to be isolated from the delivery system 10, or one pump skid 32 to be isolated from the delivery system 10. A pump truck 16 or pump skid 32 may be isolated for service or repair while the other pump trucks 16 and pump skids 32 continue to operate. This allows for services and repairs to be performed as needed or desired without having to shut down other components or the entire operation. Looking again at FIG. 2, when isolating a single pump truck 16 from the rest of the delivery system 10, truck exit valve 38 would be moved to a closed position. To isolate a pump skid 32 from the system, one or more of the valves in truck exit valve unit 42 would be moved to a closed position. The opening and closing of these valves can be either manual or by automated actuation. A catwalk ramp (not shown) can be constructed along the length of the pump skid 32 or the entire collection manifold 12 to ease access for maintenance or repair or for other access requirements.

Explosion proof safety blankets 66 may be positioned to isolate one pump skid 32 from another and thereby create a safe work area. Traditional concrete or wood constructed barriers are cumbersome and not always capable of being re-used. Safety blankets 66 act as a pressure shield and are portable, light weight, weather resistant and re-usable. Not only can safety blankets 66 be re-used at a different operation, they may also be used for other purposes at the same operation. For example, if no maintenance or repairs are being conducted, the safety blankets 66 can be used as weather shields to protect the equipment in proximity to the wellhead 18.

Figure 4:
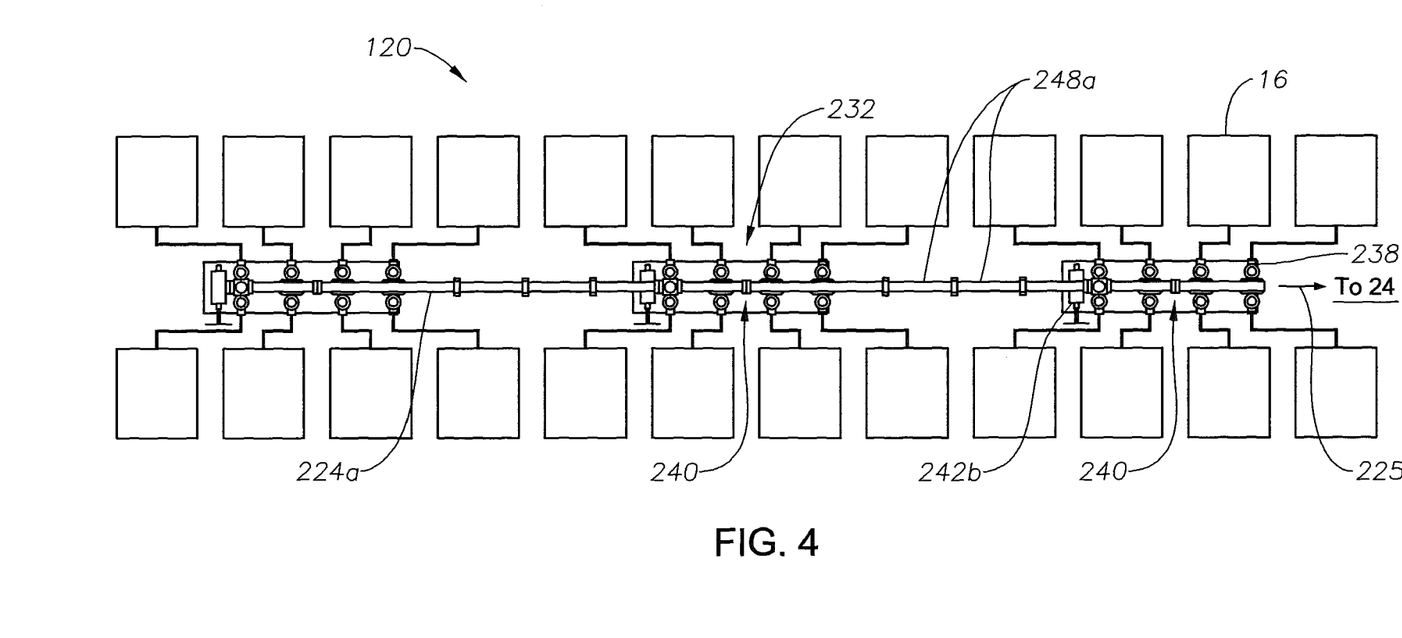
FIG. 4 is a plan view of an alternative embodiment of a collection manifold according to an embodiment of the present invention.
Figure 5:
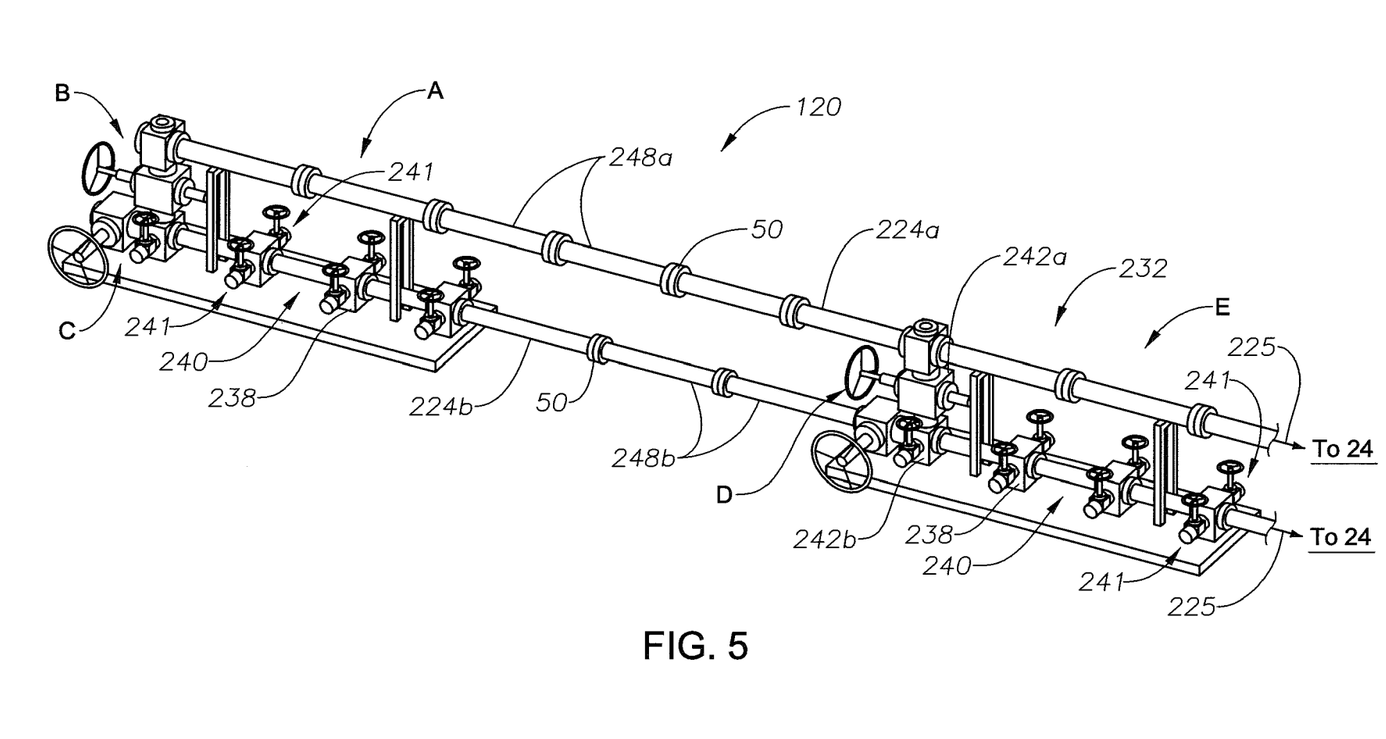
FIG. 5 is a perspective view of a portion the collection manifold of the system of FIG. 4 according to an embodiment of the present invention.

Turning now to FIGS. 4 and 5, an alternative embodiment of a collection manifold 120 includes one or more pump skids 232. As illustrated for clarity, the input lines extending between the slurry supply or blenders 19 (FIG. 1) and the pump trucks 16 and the input lines extending between the water source 25 (FIG. 1) and the pump trucks 16 are not depicted in FIGS. 4 and 5. However, as one skilled in the art will appreciate, in some embodiments, the collection manifold 120 includes these input lines.

Each of the pump skids 232 is a modular unit that is connected in series and parallel. An exit junction 240 having inlets 241 is provided on each of the pump skids 232. The inlets 241 are arranged on two opposing sides of the pump skids 232 such that pump trucks 16 can be connected to either side of the pump skid 232. The number and layout of the pump trucks 16 and pump skids 232 can vary depending on the needs of a particular operation. Pump skids 232 may be standardized and pre-fabricated before delivery to the installation site. This will improve the efficiency, cost and time, of installation as well as reduced manufacturing expenses. Standardization of the pump skids 232 will also allow for the pump skids 232 to be more easily utilized at a subsequent site.

The arrangement of pump skids 232 can be linear, as shown in FIG. 4, or they may be situated at an angle as required to fit the pad layout. As can be seen in FIG. 4 and FIG. 5, each pump skid 232 interfaces with the pump truck 16 through a truck exit valve 238 that allows removal or isolation of one or more pump trucks 16 during operation. Pressurized slurry and/or water from the pump truck 16 passes through truck exit valve 238 and is directed either to upper bypass high-pressure pipeline 224a or lower high-pressure pipeline 224b. The lower high pressure pipeline 224b connects the exit junctions 240 to one another in series. Each of the high-pressure pipelines 224a and 224b is in fluid communication with high-pressure pipeline 24 (FIG. 1), as indicated by arrows 225. The parallel piping allows fluid to bypass a particular pump skid 238 while others are in operation.

An upper truck exit valve unit 242a and lower truck exit valve unit 242b are used to control fluid flow and bypass a pump skid 232 when necessary. Upper and lower truck exit valve units 242a, 242b can be manual or actuated. This allows for services and repairs to be performed as needed or desired without having to shut down other components or the entire operation.

In an example, if the pump skid 232 labeled A on FIG. 5 is to be bypassed, upper truck exit valve unit 242a labeled B on FIG. 5, lower truck exit valve unit 242b labeled C on FIG. 5, and lower truck exit valve unit 242b labeled D on FIG. 5 would all be closed. No slurry or water would therefore be able to travel through lower high-pressure pipeline 224b between the pump skid 238 labeled A on FIG. 5 and the pump skid 232 labeled E on FIG. 5. Slurry or water flowing from any pump truck 16 connected to the pump skid 232 labeled E on FIG. 5 would therefore flow through a truck exit valve 238, through upper truck exit valve unit 242a on the pump skid 232 labeled E on FIG. 5 and continue through upper high-pressure pipeline 224a.

If all pump skids 238 are on-line, then slurry and/or water flowing from the pump truck 16 connected to the pump skid would flow through a truck exit valve 238, then could either flow through lower truck exit valve unit 242b to lower high-pressure pipeline 224b or through upper truck exit valve unit 242a to upper high-pressure pipeline 242a. In an optimized design, upper high-pressure pipeline 242a may have a larger diameter to accommodate a higher slurry and/or water flow rate. Upper high-pressure pipe segments 248a may be connected to each other with hub connectors 50. Lower high-pressure pipe segments 248b may be connected to each other with hub connectors 50.

Returning again to FIG. 1, a single high-pressure pipeline 24 transports slurry from the collection manifold 12 or 120 to the delivery section 14. A connection point skid 68 is situated at the junction between the collection manifold 12 and the delivery section 14. Connection point skid 68 includes double block valves 70, which may be used to isolate the collection manifold 12 from the delivery section 14 or to isolate one branch of the delivery section 14. Double block isolation valves 70 may be two valves in series or a single double valve.

Figure 6:
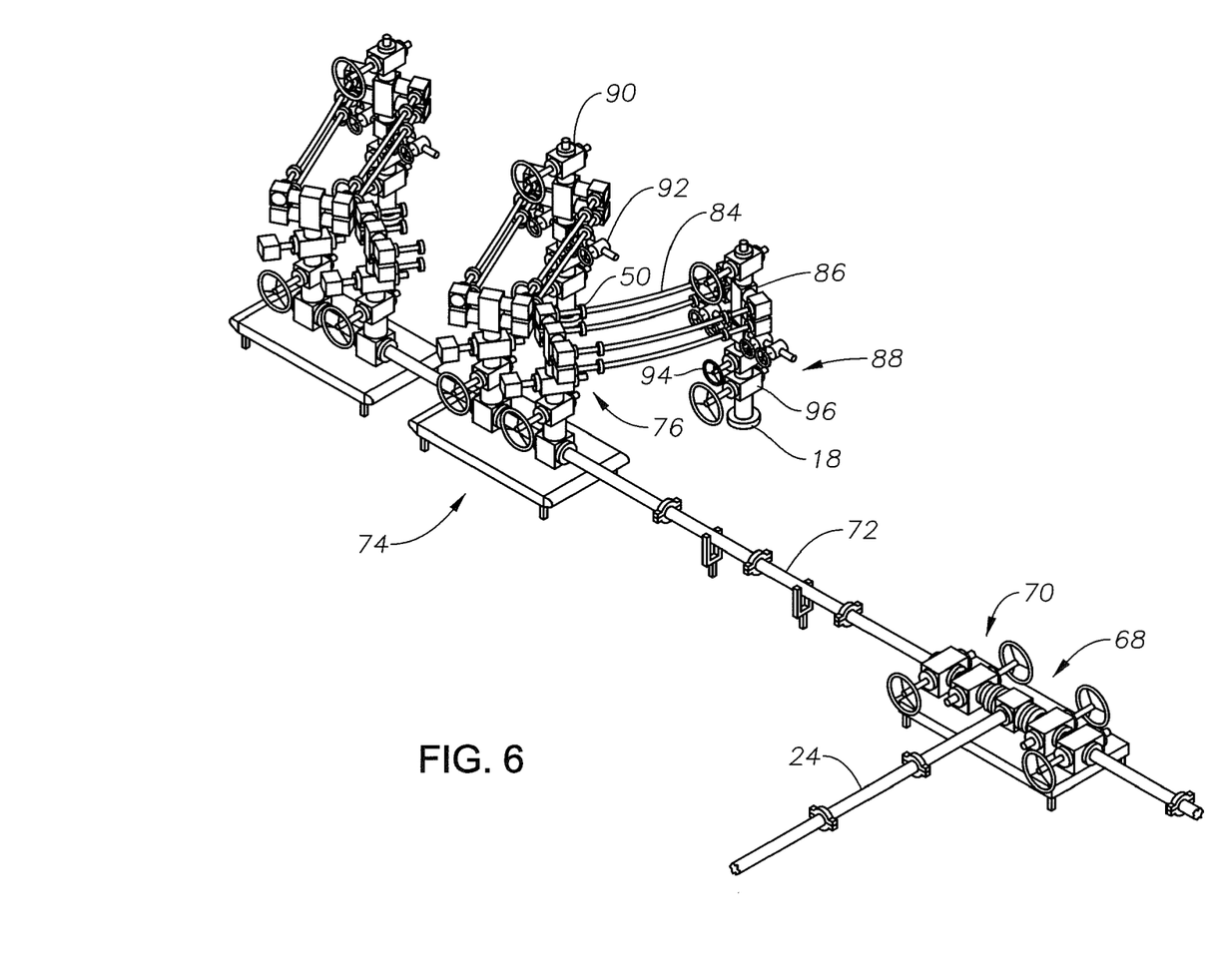
FIG. 6 is a perspective view of a portion of the delivery section of the delivery system according to an embodiment of the present invention.

As can be seen in FIG. 6, slurry flowing from the high-pressure pipeline 24 will pass through a double block valve 70 and continue through a delivery pipeline 72. One end of delivery pipeline 72 is in fluid communication with the double block valve 70 and the other end of delivery pipeline 72 is in fluid communication with a frac skid 74 adjacent wellhead 18. Frac skid 74 includes one or more frac manifolds 76.

Figure 7:
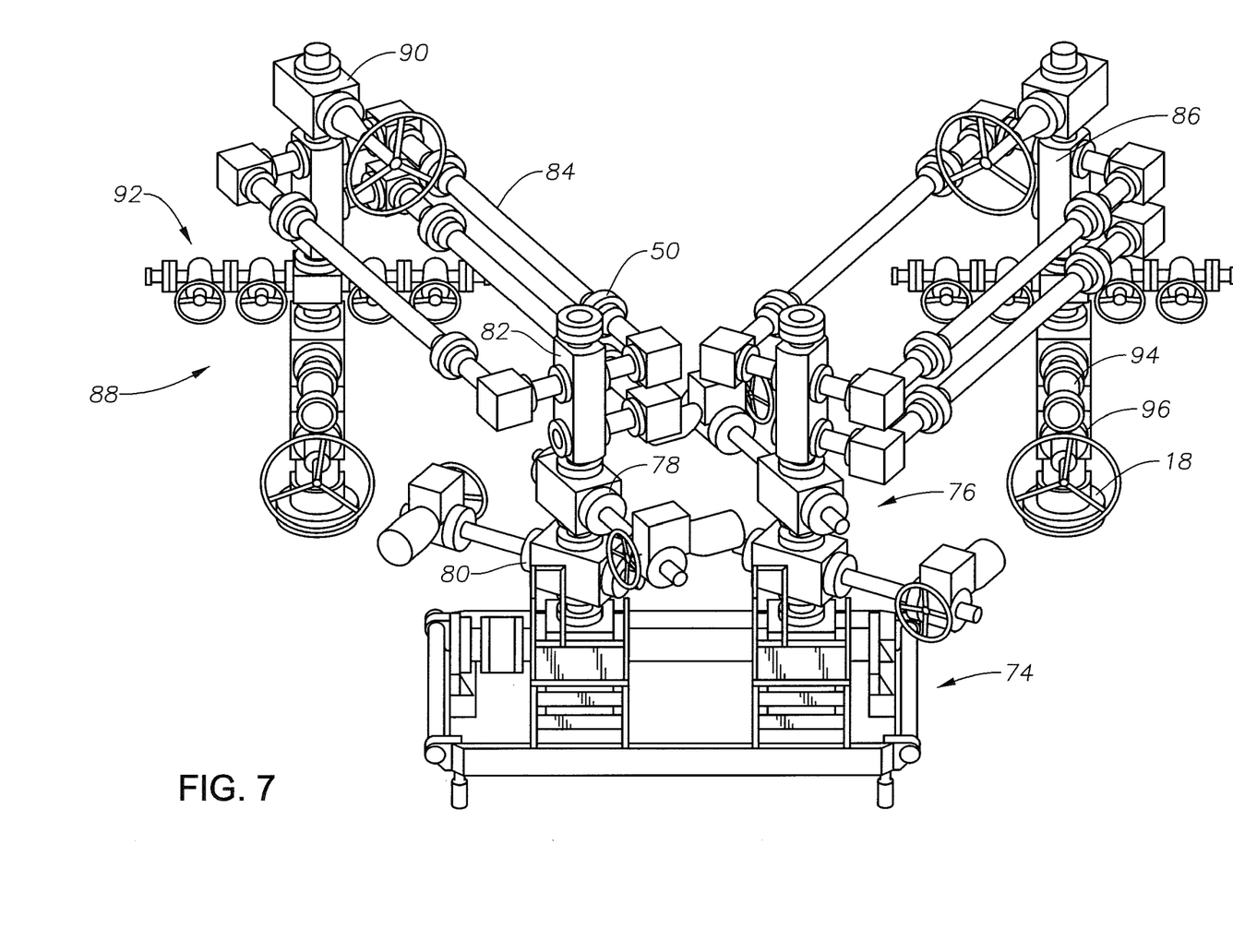
FIG. 7 is a perspective view of a portion of the delivery section of FIG. 6 according to an embodiment of the present invention.

Looking at FIG. 7, a frac manifold may include frac upper and lower master valves 78, 80, and a distribution head 82. Distribution head 82 supports a number of distribution pipelines 84 which fluidly connect the distribution head 82 to a collection head 86 on the frac tree 88. Frac tree 88 may also include a swab valve 90, wing valves 92, and upper and lower tree master valves 94, 96.

In the embodiments of FIG. 7, the distribution head 82 and collection head 86 are identical. This distributes wear more evenly and maximizes erosion life and also allows for improved efficiency in manufacturing and installation as well as reducing the costs of carrying replacement parts on hand. Distribution and collection heads 82, 86 may support any number of distribution pipelines 84, for example, two to six pipelines 84.

The distribution pipelines 84 illustrated are symmetrical with identical connection means on either end, with one end being supported by the distribution head 82 and the other end being supported by the collection head 86. Distribution pipelines 84 may be high-pressure flexible piping with hub connectors 50, or other quick connect connection means. The hub connectors 50 enhance leakage resistance due to flexing caused by vibration. This embodiment eliminates the need for skilled 3D arrangement during the design of the specific operation and welding on-site, as would be required for traditional fabricated hard loops used to connect frac equipment to the well.

In an example of operation, slurry that enters frac manifold 76 travels through distribution head 82 and is conveyed to collection head 86 by way of one of the distribution pipelines 84. The slurry then travels down through frac tree 88 and wellhead 18 and into the well.

Returning to FIG. 1, a flowback separator 98 may also be included in delivery system 10. Separator 98 can be fluidly connected to equipment on frac skid 74 with a quick connect connection means. During flowback operations, the flowback separator 98 may separate gas, sand and fluids in the flowback stream before sending it on to an onsite collection tank.

2. Leveling System

In certain operating locations, such as in boggy terrain, the components of a delivery system 10 may undergo a significant change in elevation throughout a 24-hour period, such as up to 6 inches. Movement of this range would cause significant pipeline and equipment fatigue, leading to costly maintenance and repairs. Traditionally, equipment skids are supported by piles sunk into the ground in the range of 30 to 60 feet deep. This is a very costly method of supporting equipment skids and cannot easily be re-used at another site.

Returning to FIG. 1, pump skids 32 and frac skids 74 may instead be supported by jacks 100. The jacks 100 may either be hydraulic or mechanical jacks. A laser leveling system measures the elevation of multiple components of the delivery system 10 and the jacks 100 are adjusted accordingly to maintain the elevation of the components of the delivery system 10 within a required tolerance. The adjustments of the jacks could be performed manually or a dynamic control system may be used to maintain the elevation of the components of the delivery system within a required tolerance.

An example of a laser leveling system may include a stand mounted laser 102 or another elevation measurement device. The laser 102 then measures the deviation of laser targets 104 located on each of the pump skids 32 or various delivery system 10 components relative to a reference point. In an example where a dynamic system is used, the control system actuates the jacks 100, if required, to reposition the component to be within a tolerable deviation. Alternatively, an operator could manually manipulate the jacks 100. This process is repeated at a desired interval for each of the components with laser targets 104 so that the components of delivery system 10 are not subject to excessive stresses due to misalignment cause by changes in elevation of the components. The laser leveling system is lightweight and portable and may be used for multiple operations at difference sites.

3. Erosion Protection

In order to optimize the diameter of the flow lines of delivery system 10, a computer simulation could be performed for each new operation that had different design criteria than prior operations. If the delivery system 10 was designed to have flow lines with the same diameter throughout, a larger diameter than required would be used for some flow lines because the diameter selected would need to be large enough to accommodate the highest pressure and flow rate situation. The computer simulation would instead perform an erosion analysis to determine the velocity, and flow rates of the fluid through each flow line as well as the corresponding expected erosion pattern. The size of the equipment can then be customized and reduced where allowed, which will provide an overall cost savings.

In addition, by altering the diameter of the pipelines in various high erosion risk areas, the erosion risk to that area can be reduced. For example, increasing the diameter of a flow line just prior to or immediately following a direction change, or both, may reduce erosion of the flow line at such direction change. Other changes such as increasing the diameter of seals and making the transition between diameter changes in pipelines smooth can also reduce erosion risks and increase the useful life of the components. The erosion analysis can also identify critical components that are at risk for erosion the operator can mitigate risk of failure by replacing such components after they reach their design life.

Figure 8:
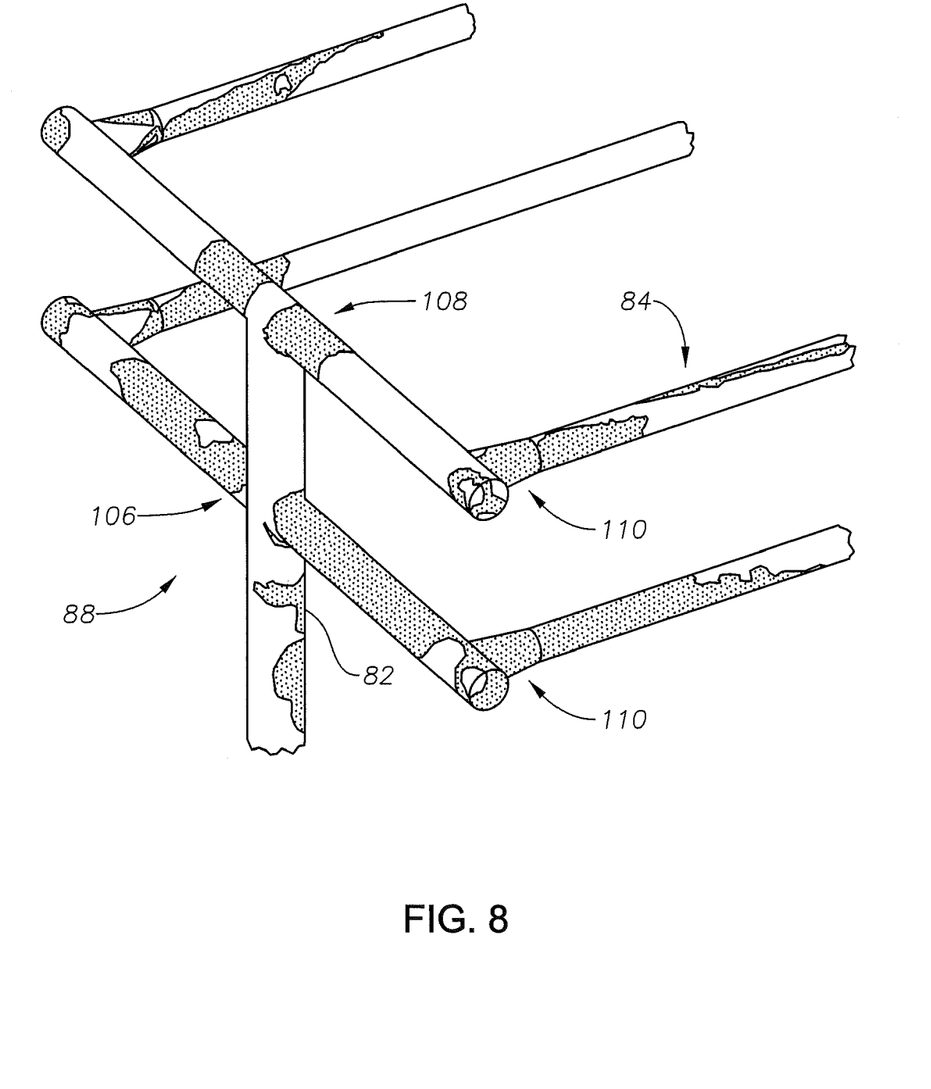
FIG. 8 is a perspective view of erosion analysis results of flow lines according to an embodiment of the present invention.

Once high erosion risk areas are identified, such as at critical changes in diameter or direction, such areas may be coated with erosion resistant features including special surface treatments to increase its useful life. Turning, for example, to FIG. 8, an erosion analysis can be performed on the frac tree 88. Shaded high erosion risk regions such as at the lower branch junction 106, upper branch junction 108, and distribution pipeline junctions 110 could be provided with surface treatments. The surface treatments may be, for example, hard nano-composites coating, tungsten carbide hardfacing, ceramic hardfacing, or other know surface treatments means.

4. Operational Procedure

In one example embodiment of use, the delivery system 10 is assembled at a well site having a plurality of wellheads 18. The collection manifold 12 and the delivery section 14 of the delivery system 10 are assembled concurrently, or in series with one another.

To assemble the collection manifold 12, a plurality of pump skids 32 are remotely assembled and delivered to the well site. The pump skids 32 are provided on a ground surface at the well site, and arranged in a convenient manner to provide sufficient clearance for a plurality of pump trucks 16 to access the distribution junction 30 and the exit junction 40 on each of the pump skids 32. Next, the a stand mounted laser 102 is employed to measure the deviation of laser targets 104 located on each of the pump skids 32, and the jacks 100 on the pump skids are activated to adjust the elevation of each of the pump skids 32 until each of the pump skids 32 are disposed at an elevation within a predetermined tolerance. An exit branch 46 or 47 is coupled to the exit junction 40 on each of the pump skids 32, and each of the exit branches 46, 47 is connected to high-pressure pipeline 24. The high-pressure pipeline 24 is assembled from pipe segments 48 and hub connectors 50 to extend between the exit branches 46, 47 and the wellheads 18. Either a slurry supply branch 29 or a water supply branch 33 is coupled to the distribution manifold 30 on each of the pump skids. Each slurry supply branch 29 is coupled to first low-pressure pipeline 20 extending between the slurry supply branches 29 and a source of slurry 19, and each water supply branch 33 is coupled to second low-pressure pipeline 26 extending between the water supply branches 33 and a water source 25.

To assemble the delivery section 14 of the delivery system 10, a plurality of frac skids 74 are provided on a ground surface adjacent the wellheads 18, and leveled in a manner similar to the pump skids 32 as described above. The frac manifolds 76 on each of the frac skids 74 are then coupled to a respective wellhead 18 by distribution pipelines 84 and a frac tree 88, and the frac skids 74 are coupled to a delivery pipeline 72, which extends toward the high-pressure pipeline 24. The pipelines 72 and 74 are each coupled to connection point skid 68, thereby coupling the delivery section 14 to the collection manifold 12.

Once the delivery system 10 is assembled, pump trucks 16 are delivered to the well site. A plurality of pump trucks 16 are coupled to the distribution junctions 30 on each of the pump skids 32 by truck connection lines 34 and to the exit junctions 40 on each of the pump skids 32 by truck exit lines 36. In other embodiments, the pump trucks 16 are coupled to the pump skids 32 concurrently with the assembly of the collection manifold 12.

To initiate delivery of fluids to the wellbores 18, the low-pressure pipelines 20 and 26 are respectively coupled to the supply of slurry 19 and to the water source 25, and the pump trucks 16 are activated. Activation of the pump trucks 16 induces slurry to flow from the supply of slurry 19 through the first low-pressure pipeline 20 and slurry supply branches 29. The slurry then enters the distribution junction 30 on a particular pump skid 32, is conducted through the pump truck 16 and is discharged into the exit junction 40 on the particular pump skid 32. The slurry then flows through the slurry exit branch 46 and into the high-pressure pipeline 24 extending toward the wellheads 18. Similarly, activation of the pump trucks 16 induces water to flow from the water source 25 through second low-pressure pipeline 26 and water supply branches 33. The water then enters the distribution junction 30 on a particular pump skid 32, is conducted through the pump truck 16 and is discharged into the exit junction 40 on the particular pump skid 32. The water then flows through the water exit branch 47 and into the high-pressure pipeline 24 extending toward the wellheads 18.

The water and slurry mix with one another as they flow through the high-pressure pipeline 24. The resulting slurry enters the delivery section 14, where it is distributed as necessary to all or some portion of the wellheads 18. Various valves are available for isolating any of the wellheads 18 from the slurry entering the delivery section 14. For example, upper and lower tree master valves 94, 96 associated with a particular wellhead 18 are closed to prevent slurry from entering the particular wellhead 18.

The various valves provided on the collection manifold 12 are employed to serve various purposes. For example, if it becomes necessary to service or repair a particular pump truck 16 while the other pump trucks 16 continue to operate, the truck exit valve 38 associated with the particular pump truck 16 is moved to a closed position to fluidly isolate the particular pump truck 16 from the high-pressure pipeline 24. The particular pump truck 16 is repaired and truck exit valve 38 is returned to an open position to fluidly recouple the particular pump truck to the high pressure pipeline. Also, for example, if it becomes necessary to provide only water to a wellhead 18, one or more of the valves in truck exit valve unit 42 is moved to a closed position for each of the pump skids to which the first low-pressure pipeline is coupled. Thus, no slurry is pumped into the high-pressure pipeline 24, and only water is delivered to the wellhead 18.

When fluid delivery to the wellheads 18 at the well site is no longer required, the delivery system 10 is disassembled. The pump skids 32 are decoupled from the pump trucks 16, the supply branches 29, 33 and the exit branches 46, 47, and the frac skids 74 are decoupled from the delivery pipeline 72 and the distribution pipelines 84. The pump skids 32 and the frac skids 74 are refurbished and moved to a second well site to be assembled into another delivery system (not shown) that suits the second well site. Similarly, the pipelines 20, 24 and 26 are disassembled, refurbished and subsequently reassembled into another delivery system.

Many modifications and other embodiments of the invention will come to the mind of those skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

What is claimed is:

1. A delivery system for delivering fluid to a wellhead, comprising:
    a water pipeline comprising an end in fluid communication with a water supply;
    a water supply branch that is in fluid communication with the water pipeline and that connects to an inlet of a water pump;
    a slurry pipeline comprising an end in fluid communication with a supply of slurry;
    a slurry supply branch that is in fluid communication with the slurry pipeline and that connects to an inlet of a slurry pump;
    a high-pressure pipeline comprising an end in fluid communication with the wellhead, wherein the high-pressure pipeline comprises first and second high-pressure pipe segments coupled to one another by a hub connector comprising a seal ring disposed longitudinally between the first and second pipe segments and a clamping ring with two opposing members operable to urge the first and second pipe segments longitudinally toward one another in response to movement of the two opposing members toward one another in a lateral direction;
    a water exit branch that is in fluid communication with the high pressure pipeline and that connects to an outlet of the water pump; and
    a slurry exit branch that is in fluid communication with the high pressure pipeline and that connects to an outlet of the slurry pump.

2. The delivery system according to claim 1, further comprising a first pump skid supporting a first distribution junction and a first exit junction thereon, wherein the slurry supply branch connects to the inlet of the slurry pump through the first distribution junction and wherein the slurry exit branch connects to the outlet of the slurry pump through the first exit junction.

3. The delivery system according to claim 2, further comprising a second pump skid supporting a second distribution junction and a second exit junction thereon, wherein the water supply branch connects to the inlet of the water pump through the second distribution junction and wherein the water exit branch connects to the outlet of the water pump through the second exit junction.

4. The delivery system according to claim 2, wherein the slurry supply branch connects to a plurality of slurry pumps through the first distribution junction and wherein the slurry exit branch connects to the plurality of slurry pumps through the first exit junction.

5. The delivery system according to claim 2, further comprising a valve fluidly coupled between the outlet of the slurry pump and the first exit junction such that the slurry pump is selectively isolatable from the high pressure pipeline.

6. The delivery system according to claim 4, further comprising a valve unit fluidly coupled between the first exit junction and the slurry exit branch such that the plurality of slurry pumps are selectively isolatable from the high pressure pipeline.

7. The delivery system according to claim 1, wherein the supply of slurry is in fluid communication with the water supply.

8. The delivery system according to claim 1, wherein the water pipeline and the slurry pipeline are in parallel with the high-pressure pipeline.

9. The delivery system according to claim 1, further comprising a frac skid adjacent the wellhead, the frac skid including at least one frac manifold in fluid communication with the high-pressure pipeline.

10. The delivery system according to claim 3, wherein the first and second pump skids each include a jack operable to adjust an elevation of the respective pump skid.

11. The delivery system according to claim 10, further comprising an elevation measurement device, and wherein the first and second pump skids each include a leveling target thereon providing a reference for the elevation measurement device.

12. A collection manifold for delivering fluid to a wellhead, the collection manifold comprising:
    a first low-pressure pipeline comprising an end in fluid communication with a source of fluid;
    a high-pressure pipeline having an end in fluid communication with the wellhead,
    a first pump skid supporting a first distribution junction and a first exit junction thereon, wherein the first low-pressure pipeline connects to an inlet of a first pump through the first distribution junction and wherein the high-pressure pipeline connects to the outlet of the first pump through the first exit junction;
    a second pump skid disposed remotely from the first pump skid, wherein the second pump skid supports a second distribution junction and a second exit junction thereon, and wherein the first low-pressure pipeline connects to an inlet of a second pump through the second distribution junction, wherein the high-pressure pipeline connects to the outlet of the second pump through the second exit junction, and wherein the first and second exit junctions are fluidly coupled in series to one another; and
    a bypass high-pressure pipeline in fluid communication with the first and second exit junctions.

13. The collection manifold according to claim 12, wherein the high-pressure pipeline connects to a plurality of pumps through a plurality of inlets defined in the first exit junction, and wherein the plurality of inlets are arranged on two opposing sides of the first pump skid.

14. The collection manifold according to claim 12, wherein the first low-pressure pipeline is a slurry pipeline in fluid communication with a source of slurry.

15. The collection manifold according to claim 14, further comprising a second low pressure pipeline, wherein the second low-pressure pipeline is a water pipeline in fluid communication with a water source and in fluid communication with the high-pressure pipeline through a third pump.

16. The collection manifold according to claim 12, further comprising a safety blanket positioned between the first and second pump skids.

17. The collection manifold according to claim 12, wherein the high-pressure pipeline comprises first and second high-pressure pipe segments coupled to one another by a hub connector comprising a seal ring disposed longitudinally between the first and second pipe segments and a clamping ring with two opposing members operable to urge the first and second pipe segments longitudinally toward one another in response to movement of the two opposing members toward one another in a lateral direction.

18. A method of assembling a manifold for delivering fluid to a wellhead, the method comprising:
- assembling a distribution junction and an exit junction to each of a plurality of bases to form a plurality of pump skids;
- arranging the plurality of pump skids at a well site;
- fluidly coupling a first low-pressure pipeline to at least one the distribution junctions disposed on the plurality of pump skids, wherein the first low pressure pipeline extends to a fluid source;
- fluidly coupling a high-pressure pipeline to each of the exit junctions disposed on the plurality of pump skids, wherein the high-pressure pipeline extends to the wellhead, and wherein the exit junctions are fluidly coupled in series to one another; and
- fluidly coupling a bypass high-pressure pipeline in fluid communication with the exit junctions.

\* \* \* \* \*